US012157329B2

(12) United States Patent
Würth et al.

(10) Patent No.: US 12,157,329 B2
(45) Date of Patent: *Dec. 3, 2024

(54) SECURITY ELEMENT HAVING AT LEAST ONE FIRST COLOR-SHIFTING AREA

(71) Applicant: Hueck Folien Gesellschaft m.b.H., Baumgartenberg (AT)

(72) Inventors: Sonja Würth, Katzelsdorf (AT); Marco Mayrhofer, Baumgartenberg (AT)

(73) Assignee: Hueck Folien Gesellschaft m.b.H., Baumgartenberg (AT)

( * ) Notice: Subject to any disclaimer, the term of this patent is extended or adjusted under 35 U.S.C. 154(b) by 0 days.

This patent is subject to a terminal disclaimer.

(21) Appl. No.: 17/754,476

(22) PCT Filed: Sep. 17, 2020

(86) PCT No.: PCT/EP2020/075988

§ 371 (c)(1),
(2) Date: Apr. 1, 2022

(87) PCT Pub. No.: WO2021/063691

PCT Pub. Date: Apr. 8, 2021

(65) Prior Publication Data

US 2024/0042786 A1 Feb. 8, 2024

(30) Foreign Application Priority Data

Oct. 3, 2019 (EP) .................................... 19201223

(51) Int. Cl.
*B42D 25/364* (2014.01)
*B42D 25/29* (2014.01)
(Continued)

(52) U.S. Cl.
CPC ......... *B42D 25/364* (2014.10); *B42D 25/324* (2014.10); *B42D 25/328* (2014.10);
(Continued)

(58) Field of Classification Search
CPC .. B42D 25/369; B42D 25/373; B42D 25/425; B42D 25/29; B42D 25/364; B42D 25/324; B42D 25/328
(Continued)

(56) References Cited

U.S. PATENT DOCUMENTS 7,405,879 B2 7/2008 Wild et al.
8,400,495 B2 3/2013 Kaule
(Continued)

FOREIGN PATENT DOCUMENTS

EP 2632739 A1 9/2013
EP 2782765 B1 12/2015
(Continued)

*Primary Examiner* — Justin V Lewis
(74) *Attorney, Agent, or Firm* — Stoel Rives LLP

(57) ABSTRACT

A security element (1) for papers of value or security papers has at least one first color-shifting region (2), wherein the security element (1) additionally has at least one second region (3), different from the first region (2), with structures (4), which reflect an image motif in different spatial regions, such that a moving image is produced for an observer when a light source (5) is moved correspondingly and/or when a viewing angle is changed, wherein, when the light source is moved and/or the viewing angle is changed, a movement of the image motif and a color-shifting effect occurs at the same time.

21 Claims, 2 Drawing Sheets

(51) Int. Cl.

| | |
|---|---|
| ***B42D 25/324*** | (2014.01) |
| ***B42D 25/328*** | (2014.01) |
| ***B42D 25/369*** | (2014.01) |
| ***B42D 25/373*** | (2014.01) |
| ***B42D 25/425*** | (2014.01) |

(52) U.S. Cl.
CPC ......... *B42D 25/369* (2014.10); *B42D 25/373* (2014.10); *B42D 25/425* (2014.10); *B42D 25/29* (2014.10)

(58) Field of Classification Search
USPC ................................ 283/74, 94, 98, 901, 72
See application file for complete search history.

(56) References Cited

U.S. PATENT DOCUMENTS

| | | | |
|---|---|---|---|
| 8,449,969 | B2 | 5/2013 | Keller et al. |
| 10,189,294 | B2 | 1/2019 | Raymond et al. |
| 10,252,562 | B2 | 4/2019 | Holmes |
| 10,882,351 | B2 | 1/2021 | Walter et al. |
| 2005/0151368 | A1 | 7/2005 | Heim |
| 2005/0175815 | A1 | 8/2005 | Wild et al. |
| 2011/0012337 | A1 | 1/2011 | Heim |
| 2015/0314629 | A1 | 11/2015 | Ritter et al. |
| 2015/0352881 | A1 | 12/2015 | Seils et al. |
| 2016/0339733 | A1 * | 11/2016 | Holmes ................ B42D 25/369 |

FOREIGN PATENT DOCUMENTS

| | | | |
|---|---|---|---|
| EP | 2885135 | B1 | 1/2018 |
| EP | 3362827 | A1 | 8/2018 |
| EP | 3632698 | A1 | 4/2020 |
| JP | 2005525946 | A | 9/2005 |
| JP | 2005533290 | A | 11/2005 |
| JP | 2010122391 | A | 6/2010 |
| JP | 2017505926 | A | 2/2017 |
| JP | 2018509313 | A | 4/2018 |
| JP | 2019038141 | A | 3/2019 |
| RU | 2316428 | C2 | 6/2005 |
| RU | 2466030 | C2 | 7/2011 |
| WO | 0103945 | A1 | 1/2001 |
| WO | 03070482 | A1 | 8/2003 |
| WO | 2007107235 | A1 | 9/2007 |
| WO | 2012048847 | A1 | 4/2012 |
| WO | 2013079542 | A2 | 6/2013 |
| WO | 2014124781 | A1 | 8/2014 |
| WO | 2015085505 | A1 | 6/2015 |
| WO | 2015107347 | A1 | 7/2015 |
| WO | 2016096086 | A1 | 6/2016 |
| WO | 2018216810 | A1 | 11/2018 |

* cited by examiner

SECURITY ELEMENT HAVING AT LEAST ONE FIRST COLOR-SHIFTING AREA

RELATED APPLICATIONS

This application is a national stage under 35 U.S.C. § 371 of International Application No. PCT/EP2020/075988, filed Sep. 17, 2020, which claims priority of European Patent Application No. 19201223.5, filed Oct. 3, 2019.

TECHNICAL FIELD

The present disclosure relates to a security element for papers of value or security papers, wherein the security element has at least one first color-shifting region.

BACKGROUND

Security elements of the initially mentioned type are usually used to increase protection against forgery of papers of value or security papers, such as banknotes, identification cards, credit cards, debit cards, tickets.

It is the object of the present invention to create a security element with an increased protection against forgery.

This object is achieved by a security element of the initially mentioned type according to the present disclosure in that the security element has at least one second region, different from the first region, with structures, which reflect an image motif in different spatial regions, such that a moving image is produced for an observer when a light source is moved correspondingly and/or when a viewing angle is changed, wherein, when the light source is moved and/or the viewing angle is changed, a movement of the image motif and a color-shifting effect occurs at the same time.

The protection against forgery is substantially increased due to the combination of the moving image and the color-shifting effect. Thus, embodiments described herein allow, for example, that with certain types of light sources, both effects can be perceived simultaneously with the naked eye. Thus, for example when using point light sources, both the color-shifting effect and the moving image can be perceived clearly.

According to an advantageous variant, the at least one first color-shifting region may have a layer with color-shifting pigments, in particular interference pigments, pigments with a color-shifting thin-layer-structure or liquid crystal pigments, or a color-shifting thin-layer-structure.

Moreover, the at least one first color-shifting region may have at least one liquid crystal layer, in particular at least one cholesteric liquid crystal layer.

Preferably, a layer enhancing the color-shifting effect, in particular a layer of a dark color and/or a layer of metal oxides such a hypostoichiometric aluminum oxide, is situated on the side of the first color-shifting layer of the first region facing away from the viewing side. The layer enhancing the color-shifting effect may, for example, be applied to the liquid crystal layer or the layer of color-shifting pigments, such that the layer of color-shifting pigments or the liquid crystal layer is arranged between the layer enhancing the color-shifting effect and the color-shifting pigment. The layer enhancing the color-shifting effect may, however, also be arranged between the carrier layer and the layer of color-shifting pigments or the at least one liquid crystal layer. Additionally, it is also possible that the carrier layer is arranged between the layer enhancing the color-shifting effect and the layer of color-shifting pigments or the liquid crystal layer.

At this point, it should be noted that between the at least one layer enhancing the color-shifting effect and the carrier layer and/or the at least one layer of color-shifting pigments or the at least one liquid crystal layer, in each case, one or multiple intermediate layers may be arranged. Moreover, it should be noted that in this document, the term layer is to be understood such that a layer may consist of multiple partial layers.

It may be provided that the color-shifting thin-layer-structure or the color-shifting pigments with a color-shifting thin-film structure has at least one absorber layer and at least one spacer layer of a dielectric material. Additionally, the thin-layer-structure may have at least one reflection layer, wherein the spacer layer is arranged between the reflection layer and the absorber layer.

It is particularly preferred that the security element comprises a carrier layer of plastic, in particular of a translucent and/or thermoplastic material, wherein the carrier layer preferably comprises at least one of the materials from the group of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylcholride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or mixtures and/or copolymers of these materials or is made of at least one of these materials.

It has proven particularly favorable that the carrier layer has a thickness of 5 μm to 1000 μm, particularly preferably a thickness of 10 μm-50 μm.

In a particularly preferred embodiment, it is provided that the at least one absorber layer comprises at least one metallic material, in particular selected from the group of nickel, titanium, vanadium, chromium, cobalt, palladium, iron, tungsten, molybdenum, niobium, aluminum, silver, copper and/or alloys of these materials or is made of at least one of these materials.

According to some embodiments, it is provided that the at least one spacer layer comprises at least one low refractive index dielectric material having a refractive index of less than or equal to 1.65, in particular selected from the group of aluminum oxide ($Al_2O_3$), metal fluorides, for example magnesium fluoride ($MgF_2$), aluminum fluoride ($AlF_3$), silicon oxide ($SIO_x$), silicon dioxide ($SiO_2$), cerium fluoride ($CeF_3$), sodium aluminum fluorides (e.g. $Na_3AlF_6$ or $Na_5Al_3F_{14}$), neodymium fluoride ($NdF_3$), lanthanum fluoride ($LaF_3$), samarium fluoride ($SmF_3$) barium fluoride ($BaF_2$), calcium fluoride ($CaF_2$), lithium fluoride (LiF), low refractive index organic monomers and/or low refractive index organic polymers, or at least one high refractive index dielectric material having a refractive index of greater than 1.65, in particular selected from the group of zinc sulfide (ZnS), zinc oxide (ZnO), titanium dioxide ($TiO_2$), carbon (C), indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron (II,III) oxide (Fe3O4) and iron (III) oxide (Fe2O3), hafnium nitride (HfN), hafnium carbide (HfC), hafnium oxide (HfO2), lanthanum oxide (La2O3), magnesium oxide (MgO), neodymium oxide (Nd2O3), praseodymium oxide (Pr6O11), samarium oxide (Sm2O3), antimony trioxide (Sb2O3), silicon carbide (SiC), silicon nitride (Si3N4), silicon monoxide (SiO), selenium trioxide (Se2O3), tin oxide (SnO2), tungsten trioxide (WO3), high refractive index organic monomers and/or high refractive index organic polymers, or is made of at least one of these materials.

It is preferred that that the at least one reflection layer comprises at least one metallic material, in particular selected from the group of silver, copper, aluminum, gold, platinum, niobium, tin, or of nickel, titanium, vanadium, chromium, cobalt and palladium, or alloys of these materials, in particular cobalt-nickel alloys, or of at least one high refractive index dielectric material having a refractive index of larger than 1.65, in particular selected from the group of zinc sulfide (ZnS), zinc oxide (ZnO), titanium dioxide (TiO2), carbon (C), indium oxide (In2O3), indium tin oxide (ITO), tantalum pentoxide (Ta2O5), cerium oxide (CeO2), yttrium oxide (Y2O3), Europium oxide (Eu2O3), iron oxides such as iron (II,III) oxide (Fe3O4) and iron (III) oxide (Fe2O3), hafnium nitride (HfN), hafnium carbide (HfC), hafnium oxide (HfO3), lanthanum oxide (La2O3), magnesium oxide (MgO), neodymium oxide (Nd2O3), praseodymium oxide (Pr6O11), samarium oxide (Sm2O3), antimony trioxide (Sb3O3), silicon carbide (SiC), silicon nitride (Si3N4), silicon monoxide (SiO), selenium trioxide (Se2O3), tin oxide (SnO2), tungsten trioxide (WO3), high refractive index organic monomers and/or high refractive index organic polymers, or is made of at least one of these materials.

In a favorable embodiment, the structures of the second region may also be formed as diffractive structures, as micromirrors, or as facets with a radiation-optical effect.

Moreover, multiple structures may form a group, the orientations of which are coordinated with one another such that they project one dot of the image motif in an observation space, wherein the image motif is composed of the sum of all dots projected by the group, and wherein, when the direction of arrival of the light generated by the light source is changed and/or when the viewing angle is changed, a movement of the dot in the observation space is created.

It is particularly preferred if the structures are inserted into the carrier layer by means of an impression device, in particular by an embossing process.

Moreover, it has proven advantageous that the structures are formed, in particular embossed by means of an impression element, in a layer, in particular an embossing lacquer layer, applied to the carrier layer directly or with further intermediate layers being arranged.

Preferably, the layer with the structures formed therein has a layer thickness of between 0.5-300 μm, in particular between 0.8-50 μm, preferably between 1-10 μm.

In a further embodiment of the security element according to the present disclosure, it is provided that it has at least one reflective layer on a side of the carrier layer facing away from the structures and/or a reflective layer is arranged between the carrier layer and the structures and/or the structures are coated with at least one reflective layer, wherein the at least one reflective layer comprises at least one metallic material, in particular selected from the group of silver, copper, aluminum, gold, platinum, niobium, tin, or of nickel, titanium, vanadium, chromium, cobalt and palladium, or alloys of these materials, in particular cobalt-nickel alloys, or at least one high refractive index dielectric material having a refractive index of larger than 1.65, in particular selected from the group of zinc sulfide (ZnS), zinc oxide (ZnO), titanium dioxide (TiO2), carbon (C), indium oxide (In2O3), indium tin oxide (ITO), tantalum pentoxide (Ta2O5), cerium oxide (CeO2), yttrium oxide (Y2O3), Europium oxide (Eu2O3), iron oxides such as iron (II,III) oxide (Fe3O4) and iron (III) oxide (Fe2O3), hafnium nitride (HfN), hafnium carbide (HfC), hafnium oxide (HfO3), lanthanum oxide (La2O3), magnesium oxide (MgO), neodymium oxide (Nd2O3), praseodymium oxide (Pr6O11), samarium oxide (Sm2O3), antimony trioxide (Sb3O3), silicon carbide (SiC), silicon nitride (Si3N4), silicon monoxide (SiO), selenium trioxide (Se2O3), tin oxide (SnO2), tungsten trioxide (WO3), high refractive index organic monomers and/or high refractive index organic polymers, or is made of at least one of these materials.

Moreover, the security element may be equipped with machine-readable features, wherein the machine-readable features in particular are magnetic coding, electrically conductive layers, materials absorbing and/or remitting electromagnetic waves.

Furthermore, the security element may have additional layers, which comprise additional layers, in particular protective lacquers, heat-sealing lacquers, adhesives, primers and/or films.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF EXEMPLARY EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The figure descriptions are intertwined.

Figure 1:
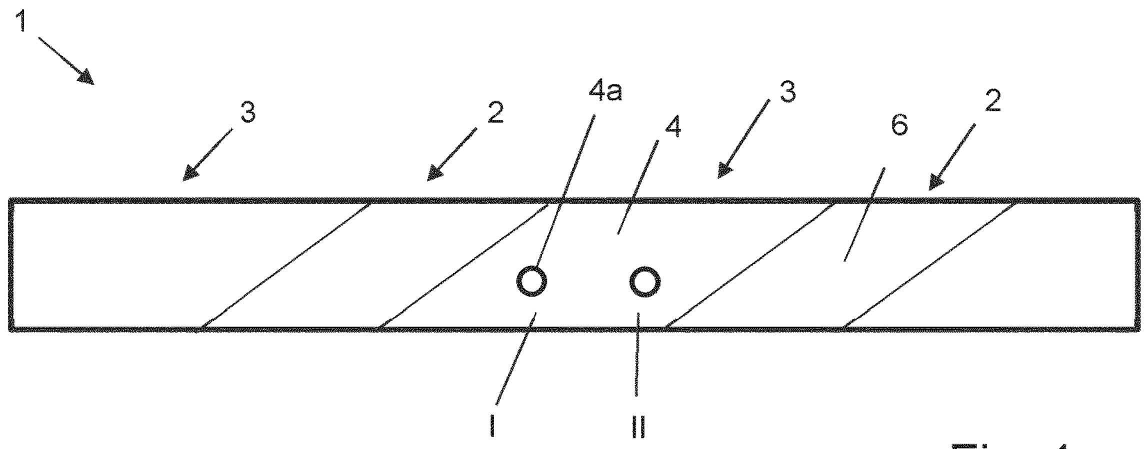
FIG. 1 a security element according to an embodiment.

According to FIG. 1, a security element 1 according to the an embodiment, for papers of value or security papers, has one or multiple first color-shifting regions 2. Additionally, the security element has one or multiple second regions 3, different from the first region 2, with structures, which reflect an image motif 4*a* in different spatial regions, such that a moving image is produced for an observer when a light source is moved correspondingly and/or when a viewing angle is changed.

Figure 2:
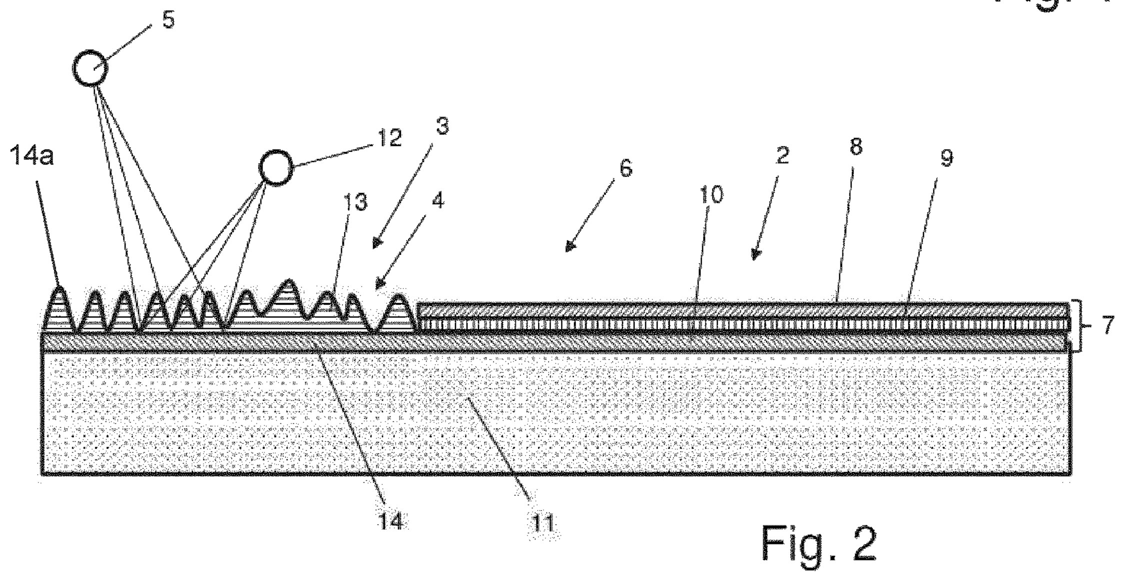
FIG. 2 a section through a first embodiment a security element.

In FIG. 2, the structures are provided with the reference number 4, and the light source is provided with the reference number 5. When the light source 5 is moved and/or the viewing angle is changed, a movement of the image motif and a color-shifting effect occurs at the same time.

Depending on the lighting, both effects can be perceived at the same time or only one of the two effects may be perceived. It has become apparent that for example when using point light sources, both the color-shifting effect and the moving image can be clearly perceived, whereas in the case of diffuse lighting, the moving image cannot be perceived at all or only significantly more faintly.

Figure 3:
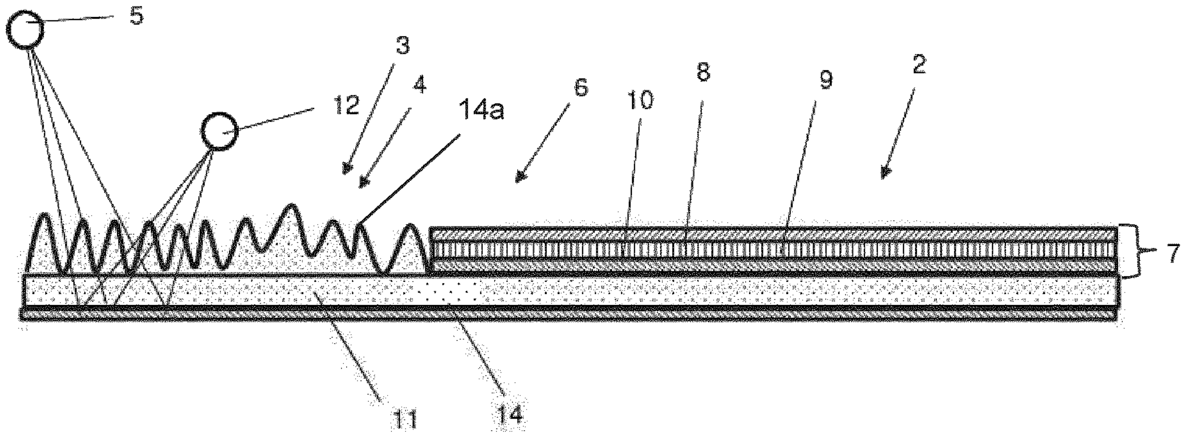
FIG. 3 a section through a second embodiment a security element.

As can be seen in FIGS. 2 and 3, the color-shifting region 2 may have a color-shifting layer 6, for example with color-shifting pigments, a color-shifting liquid crystal layer, or a color-shifting thin-layer-structure 7. The previously described region 3 different from the first region 2 has the structures 4. In the two exemplary embodiments, the two regions 2 and 3 are shown adjacently so as to lie next to one another.

The color-shifting thin-layer-structure 7 may have an absorber layer 8 and a spacer layer 9 of a dielectric material. Additionally, the thin-layer-structure 7 may have a reflection layer 10. As shown in FIGS. 2 and 3, the spacer layer 9 is arranged between the reflection layer 10 and the absorber layer 8. If, for example, a lacquer with color-shifting pigments is used to realize the layer 6, these pigments may each have a thin-layer-structure 7 as just described. The absorber layer 8 may comprise a metallic material, in particular selected from the group of nickel, titanium, vanadium, chromium, cobalt, palladium, iron, tungsten, molybdenum, niobium, aluminum, silver, copper and/or alloys of these materials or can be made of at least one of these materials.

Moreover, the one spacer layer 9 may comprise, for example, at least one low refractive index dielectric material having a refractive index of less than or equal to 1.65, in particular selected from the group of aluminum oxide (Al2O3), metal fluorides, for example magnesium fluoride (MgF2), aluminum fluoride (AlF3), silicon oxide (SIOx), silicon dioxide (SiO2), cerium fluoride (CeF3), sodium aluminum fluorides (e.g. Na3AlF6 or Na5Al3F14), neodymium fluoride (NdF3), lanthanum fluoride (LaF3), samarium fluoride (SmF3) barium fluoride (BaF2), calcium fluoride (CaF2), lithium fluoride (LiF), low refractive index organic monomers and/or low refractive index organic polymers, or at least one high refractive index dielectric material having a refractive index of greater than 1.65, in particular selected from the group of zinc sulfide (ZnS), zinc oxide (ZnO), titanium dioxide (TiO2), carbon (C), indium oxide (In2O3), indium tin oxide (ITO), tantalum pentoxide (Ta2O5), cerium oxide (CeO2), yttrium oxide (Y2O3), europium oxide (Eu2O3), iron oxides such as iron (II,III) oxide (Fe3O4) and iron (III) oxide (Fe2O3), hafnium nitride (HfN), hafnium carbide (HfC), hafnium oxide (HfO2), lanthanum oxide (La2O3), magnesium oxide (MgO), neodymium oxide (Nd2O3), praseodymium oxide (Pr6O11), samarium oxide (Sm2O3), antimony trioxide (Sb2O3), silicon carbide (SiC), silicon nitride (Si3N4), silicon monoxide (SiO), selenium trioxide (Se2O3), tin oxide (SnO2), tungsten trioxide (WO3), high refractive index organic monomers and/or high refractive index organic polymers, or can be made of at least one of these materials.

Additionally, the reflection layer 10 may comprise at least one metallic material, in particular selected from the group of silver, copper, aluminum, gold, platinum, niobium, tin, or of nickel, titanium, vanadium, chromium, cobalt and palladium, or alloys of these materials, in particular cobalt-nickel alloys, or of at least one high refractive index dielectric material having a refractive index of larger than 1.65, in particular selected from the group of zinc sulfide (ZnS), zinc oxide (ZnO), titanium dioxide (TiO2), carbon (C), indium oxide (In2O3), indium tin oxide (ITO), tantalum pentoxide (Ta2O5), cerium oxide (CeO2), yttrium oxide (Y2O3), Europium oxide (Eu2O3), iron oxides such as iron (II,III) oxide (Fe3O4) and iron (III) oxide (Fe2O3), hafnium nitride (HfN), hafnium carbide (HfC), hafnium oxide (HfO3), lanthanum oxide (La2O3), magnesium oxide (MgO), neodymium oxide (Nd2O3), praseodymium oxide (Pr6O11), samarium oxide (Sm2O3), antimony trioxide (Sb3O3), silicon carbide (SiC), silicon nitride (Si3N4), silicon monoxide (SiO), selenium trioxide (Se2O3), tin oxide (SnO2), tungsten trioxide (WO3), high refractive index organic monomers and/or high refractive index organic polymers, or can be made of at least one of these materials.

Color-shifting pigments may also be used instead of the thin-layer element 7. The color-shifting pigments may for example have a thin-layer-structure, which may be formed in particular on both sides of a reflector, meaning it may have a layer sequence absorber/spacer layer/reflector/spacer layer/absorber. Such pigments do not necessarily require a layer enhancing the color-shifting effect. However, the color-shifting pigments may also be formed by simpler interference pigments, e.g. silica flakes or glimmer, which may require a layer enhancing the color-shifting effect, in particular a layer of a dark color and/or a layer of metal oxides such as hypostoichiometric aluminum oxide. Moreover, the color-shifting pigments may be realized as LC pigments (liquid crystal pigments).

Moreover, the color-shifting region 2 may have one or multiple liquid crystal layers, in particular one or multiple cholesteric liquid crystal layers.

Preferably, a layer enhancing the color-shifting effect, in particular a layer of a dark color and/or a layer of metal oxides such a hypostoichiometric aluminum oxide, is situated on the side of the color-shifting layer of the first region facing away from the viewing side.

The layer enhancing the color-shifting effect may, for example, be applied to the liquid crystal layer or the layer of color-shifting pigments, such that the layer of color-shifting pigments or the liquid crystal layer is arranged between the layer enhancing the color-shifting effect and the color-shifting pigment. The layer enhancing the color-shifting effect may, however, also be arranged between the carrier layer and the layer of color-shifting pigments or the at least one liquid crystal layer. Additionally, it is also possible that the carrier layer is arranged between the layer enhancing the color-shifting effect and the layer of color-shifting pigments or the liquid crystal layer.

Between the layer enhancing the color-shifting effect and the carrier layer and/or the layer of color-shifting pigments or the liquid crystal layer, in each case, one or multiple intermediate layers may be arranged.

Furthermore, the security element 1 according to FIGS. 2 and 3, may have a carrier layer 11 of plastic, in particular of a translucent and/or thermoplastic material. The carrier layer 11 preferably comprises at least one of the materials from the group of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylcholride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or mixtures and/or copolymers of these materials or is made of at least one of these materials.

Preferably, the carrier layer 11 has a thickness of 5 μm to 1000 μm, particularly preferably a thickness of 10 μm-50 μm. The structures 4 may be formed, in a manner that is known per se, as diffractive structures, as micromirrors, or as facets with a radiation-optical effect. The formation of the structures 4 as a diffractive structures has become known, for example from EP2782765B1, EP2885135B1 and WO2015107347A1. An embodiment of the structures 4 as micromirrors is known to the person skilled in the art e.g. from U.S. Pat. No. 10,189,294A1 as well as EP3362827A1. A facet-like formation of the structures 4 results, for example from EP2632739A1. As the formation of the structures 4 for creating moving images is known to the person skilled in the art, it is not further elucidated at this point to avoid unnecessary circuitousness.

Multiple structures 4 may form a group, the orientations of which are coordinated with one another such that they project one dot 12 of the image motif 4*a* in an observation space. The image motif 4*a* is composed of the sum of all dots 12 projected by the group. When the direction of arrival of the light generated by the light source 5 is changed and/or when the viewing angle is changed, a movement of the dot 12 in the observation space is created and/or such a movement of the image motif 4*a* is perceived. For example, when moving the light source 5 or when changing the viewing angle, the image motif 4*a*, here in the form of a circle, of FIG. 1 moves out of the position labeled with I to a location labeled as II and vice versa.

The structures 4 may be formed in a layer 13, in particular an embossing lacquer layer, applied to the carrier layer 11. Preferably, they are embossed by means of an impression element. Preferably, the layer 13 with the structures 4 formed therein has a layer thickness of between 0.5-300 μm, in particular between 0.8-50 μm, preferably between 1-10 μm.

For producing the security element 1 according to the present disclosure, the carrier layer 11 may be coated with the layer 10 and the layer 14 either completely or partially. Subsequently, the resulting multilayer composite can be completely or partially provided with the layer 13, and the structures 4 may be introduced into them, for example by embossing. Subsequently, the individual layers of the thin-layer element 7 can be applied to create the color-shifting region. In this regard, it is possible to apply the thin-layer element 7 or the color-shifting layer only in regions of the color-shifting region 2 or also to apply the individual layers of the thin-layer element 7 and/or the color-shifting layer in the region of the structures 4 and for example, to remove them using wash ink in a manner known per se. It is self-evident that the embodiments described above are only to be understood as examples and there are generally many methods known to the person skilled in the art for realizing a structure corresponding to the security element 1 according to the disclosure.

Further layers may be arranged between the layer 13 and the carrier layer 11, for example an adhesion promoter layer or also a reflective layer 14. On the reflective layer 14, light beams passing through the structures 4 can be reflected in order to project the dot 12 in the observation space. The embodiment shown her is advantageous particularly for diffractive structures. As can be seen in FIG. 2, the reflective layer 14 may form a layer with the reflection layer 10 of the thin-layer-structure 7 and may also be made from the same materials as the latter. At this point, it should be noted that a reflective layer 14*a* may also be arranged on the structures 4, such that the structures 4 are situated between the reflective layer 14*a* and the carrier layer 11. In this case, the reflective layer 14*a* follows the shape of the structures if it is arranged on the structures 4. In this regard, the structures 4 may be coated with the reflective layer 14*a* either partially or completely. The layer 14*a* may be provided in place of the layer 14 or in addition to it.

As an alternative to using a separate layer 13 in which the structures 4 are formed, the structures 4 may also be inserted directly into the carrier layer 11 by means of an impression device, in particular by means of an embossing process, as it is shown in FIG. 3. In this case, the reflective layer 14 may be applied to a side of the carrier layer facing away from the structures 4, and/or the structures 4 may be coated with the layer 14*a* over the entire surface or partially.

Also in the case of forming structures 4 as micromirrors or facets, the reflective layer 14*a* may be arranged on the structures 4, and/or the structures 4 may be coated at least partially with the layer 14*a*.

The reflective layer 14 and the layer 14*a* preferably comprise a metallic material, in particular selected from the group of silver, copper, aluminum, gold, platinum, niobium, tin, or of nickel, titanium, vanadium, chromium, cobalt and palladium, or alloys of these materials, in particular cobalt-nickel alloys, or at least one high refractive index dielectric material having a refractive index of larger than 1.65, in particular selected from the group of zinc sulfide (ZnS), zinc oxide (ZnO), titanium dioxide (TiO2), carbon (C), indium oxide (In2O3), indium tin oxide (ITO), tantalum pentoxide (Ta2O5), cerium oxide (CeO2), yttrium oxide (Y2O3), Europium oxide (Eu2O3), iron oxides such as iron (II,III) oxide (Fe3O4) and iron (III) oxide (Fe2O3), hafnium nitride (HfN), hafnium carbide (HfC), hafnium oxide (HfO3), lanthanum oxide (La2O3), magnesium oxide (MgO), neodymium oxide (Nd2O3), praseodymium oxide (Pr6O11), samarium oxide (Sm2O3), antimony trioxide (Sb3O3), silicon carbide (SiC), silicon nitride (Si3N4), silicon monoxide (SiO), selenium trioxide (Se2O3), tin oxide (SnO2), tungsten trioxide (WO3), high refractive index organic monomers and/or high refractive index organic polymers, or is made of at least one of these materials.

Finally, it should be noted that the embodiment shown in FIG. 3 could also be modified to the effect that the carrier layer 11 could act as a spacer layer 8 and the reflection layer 14 could act as reflection layer 10, such that only layers 14, 11, and 9 are present in the color-shifting region 2.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

The invention claimed is:

1. A security element for papers of value or security papers, comprising:

at least one color-shifting first region including at least one liquid crystal layer, and at least one second region different from the first region, with structures that reflect an image motif in different spatial regions, such that a moving image is produced for an observer when a light source is moved correspondingly and/or when a viewing angle is changed, wherein, when the light source is moved and/or the viewing angle is changed, a movement of the image motif and a color-shifting effect occur.

2. The security element according to claim 1, wherein the at least one color-shifting first region has at least one layer enhancing the color-shifting effect including a layer of a dark color and/or a layer of metal oxides.

3. The security element according to claim 2, further comprising a carrier layer, and wherein the layer enhancing the color-shifting effect is applied to the at least one liquid crystal layer, such that the at least one liquid crystal layer is arranged between the at least one layer enhancing the color-shifting effect and the carrier layer, or that the at least one layer enhancing the color-shifting effect is arranged between the carrier layer and the at least one liquid crystal layer, or that the carrier layer is arranged between the at least one layer enhancing the color-shifting effect and the at least one liquid crystal layer.

4. The security element according to claim 1, wherein the security element has a carrier layer of a translucent plastic material and/or a thermoplastic material, wherein the carrier layer comprises at least one of the materials from the group of polyimide (PI), polypropylene (PP), monoaxially oriented polypropylene (MOPP), biaxially oriented polypropylene (BOPP), polyethylene (PE), polyphenylene sulfide (PPS), polyetheretherketone, (PEEK) polyetherketone (PEK), polyethylene imide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile-butadiene-styrene (ABS), polyvinylcholride (PVC) ethylene tetrafluoroethylene (ETFE), polytetrafluoroethylene (PTFE), polyvinyl fluoride (PVF), polyvinylidene fluoride (PVDF), and ethylene-tetrafluoroethylene-hexafluoropropylene-fluoropolymer (EFEP) and/or mixtures and/or copolymers of these materials.

5. The security element according to claim 4, wherein the carrier layer has a thickness of 5 μm to 1000 μm.

6. The security element according to claim 4, further comprising at least one reflective layer on a side of the carrier layer facing away from the structures and/or a reflective layer arranged between the carrier layer and the structures and/or the structures are coated with at least one reflective layer, wherein the at least one reflective layer comprises at least one metallic material selected from the group of silver, copper, aluminum, gold, platinum, niobium, tin, or of nickel, titanium, vanadium, chromium, cobalt and palladium, or alloys of these materials, or at least one high refractive index dielectric material having a refractive index of larger than 1.65 and selected from the group of zinc sulfide (ZnS), zinc oxide (ZnO), titanium dioxide (TiO2), carbon (C), indium oxide (In2O3), indium tin oxide (ITO), tantalum pentoxide (Ta2O5), cerium oxide (CeO2), yttrium oxide (Y2O3), europium oxide (Eu2O3), iron oxides, iron (II,III) oxide (Fe3O4), iron (III) oxide (Fe2O3), hafnium nitride (HfN), hafnium carbide (HfC), hafnium oxide (HfO2), lanthanum oxide (La2O3), magnesium oxide (MgO), neodymium oxide (Nd2O3), praseodymium oxide (Pr6O11), samarium oxide (Sm2O3), antimony trioxide (Sb2O3), silicon carbide (SIC), silicon nitride (Si3N4), silicon monoxide (SiO), selenium trioxide (Se2O3), tin oxide (SnO2), tungsten trioxide (WO3), high refractive index organic monomers and/or high refractive index organic polymers.

7. The security element according to claim 1, wherein the structures of the second region are formed as diffractive structures, as micromirrors or as facets with a radiation-optical effect.

8. The security element according to claim 1, wherein the security element is equipped with machine-readable features, wherein the machine-readable features are magnetic coding, electrically conductive layers, materials absorbing and/or remitting electromagnetic waves.

9. The security element according to claim 1, wherein the security element has additional layers, said additional layers comprising protective lacquers, heat-sealing lacquers, adhesives, primers and/or films.

10. The security element according to claim 1, wherein the structures are arranged to reflect the image motive in different spatial regions such that the movement of the image motif and the color-shifting effect occur simultaneously when the light source is moved and/or the viewing angle is changed.

11. The security element according to claim 1, wherein the at least one liquid crystal layer comprises at least one cholesteric liquid crystal layer.

12. A security element for papers of value or security papers, comprising:

at least one color-shifting first region, and at least one second region different from the first region, with structures that reflect an image motif in different spatial regions, such that a moving image is produced for an observer when a light source is moved correspondingly and/or when a viewing angle is changed, wherein, when the light source is moved and/or the viewing angle is changed, a movement of the image motif and a color-shifting effect occur, wherein the at least one color-shifting first region has a layer with color-shifting pigments or a layer with a color-shifting thin-layer-structure, wherein the color-shifting thin-layer-structure or the color-shifting pigments has at least one absorber layer and at least one spacer layer of a dielectric material, wherein the at least one absorber layer comprises at least one metallic material selected from the group of nickel, titanium, vanadium, chromium, cobalt, palladium, iron, tungsten, molybdenum, niobium, aluminum, silver, copper and/or alloys of these materials.

13. The security element according to claim 12, wherein the at least one spacer layer comprises at least one low refractive index dielectric material having a refractive index of less than or equal to 1.65 and selected from the group of aluminum oxide (Al2O3), metal fluorides, magnesium fluoride (MgF2), aluminum fluoride (AlF3), silicon oxide (SIOx), silicon dioxide (SiO2), cerium fluoride (CeF3), sodium aluminum fluorides (e.g. Na3AlF6 or Na5Al3F14), neodymium fluoride (NdF3), lanthanum fluoride (LaF3), samarium fluoride (SmF3) barium fluoride (BaF2), calcium fluoride (CaF2), lithium fluoride (LiF), low refractive index organic monomers and/or low refractive index organic polymers, or at least one high refractive index dielectric material having a refractive index of greater than 1.65 and selected from the group of zinc sulfide (ZnS), zinc oxide (ZnO), titanium dioxide (TiO2), carbon (C), indium oxide (In2O3), indium tin oxide (ITO), tantalum pentoxide (Ta2O5), cerium oxide (CeO2), yttrium oxide (Y2O3), europium oxide (Eu2O3), iron oxides, iron (II,III) oxide (Fe3O4), iron (III)

oxide (Fe2O3), hafnium nitride (HfN), hafnium carbide (HfC), hafnium oxide (HfO2), lanthanum oxide (La2O3), magnesium oxide (MgO), neodymium oxide (Nd2O3), praseodymium oxide (Pr6O11), samarium oxide (Sm2O3), antimony trioxide (Sb2O3), silicon carbide (SiC), silicon nitride (Si3N4), silicon monoxide (SiO), selenium trioxide (Se2O3), tin oxide (SnO2), tungsten trioxide (WO3), high refractive index organic monomers and/or high refractive index organic polymers.

14. The security element according to claim 12, wherein the structures are arranged to reflect the image motive in different spatial regions such that the movement of the image motif and the color-shifting effect occur simultaneously when the light source is moved and/or the viewing angle is changed.

15. The security element according to claim 12, wherein the security element is equipped with machine-readable features, wherein the machine-readable features are magnetic coding, electrically conductive layers, materials absorbing and/or remitting electromagnetic waves.

16. The security element according to claim 12, wherein the security element has additional layers, said additional layers comprising protective lacquers, heat-sealing lacquers, adhesives, primers and/or films.

17. A security element for papers of value or security papers, comprising:

at least one color-shifting first region, and at least one second region different from the first region, with structures that reflect an image motif in different spatial regions, such that a moving image is produced for an observer when a light source is moved correspondingly and/or when a viewing angle is changed, wherein, when the light source is moved and/or the viewing angle is changed, a movement of the image motif and a color-shifting effect occur, wherein the at least one color-shifting first region has a layer with color-shifting pigments or a layer with a color-shifting thin-layer-structure, wherein the color-shifting thin-layer-structure or the color-shifting pigments has at least one absorber layer, at least one reflection layer, and at least one spacer layer of a dielectric material arranged between the reflection layer and the absorber layer, wherein the at least one reflection layer comprises at least one metallic material selected from the group of silver, copper, aluminum, gold, platinum, niobium, tin, or of nickel, titanium, vanadium, chromium, cobalt and palladium, or alloys of these materials, or at least one high refractive index dielectric material having a refractive index of larger than 1.65 and selected from the group of zinc sulfide (ZnS), zinc oxide (ZnO), titanium dioxide (TiO2), carbon (C), indium oxide (In2O3), indium tin oxide (ITO), tantalum pentoxide (Ta2O5), cerium oxide (CeO2), yttrium oxide (Y2O3), europium oxide (Eu2O3), iron oxides, iron (II,III) oxide (Fe3O4), iron (III) oxide (Fe2O3), hafnium nitride (HfN), hafnium carbide (HfC), hafnium oxide (HfO2), lanthanum oxide (La2O3), magnesium oxide (MgO), neodymium oxide (Nd2O3), praseodymium oxide (Pr6O11), samarium oxide (Sm2O3), antimony trioxide (Sb2O3), silicon carbide (SIC), silicon nitride (Si3N4), silicon monoxide (SiO), selenium trioxide (Se2O3), tin oxide (SnO2), tungsten trioxide (WO3), high refractive index organic monomers and/or high refractive index organic polymers.

18. A security element for papers of value or security papers, comprising:

at least one color-shifting first region, and at least one second region different from the first region, with structures that reflect an image motif in different spatial regions, such that a moving image is produced for an observer when a light source is moved correspondingly and/or when a viewing angle is changed, wherein, when the light source is moved and/or the viewing angle is changed, a movement of the image motif and a color-shifting effect occur, wherein at least some of the structures form a group of structures having coordinated orientations of such that each of the structures in the group of structures projects one dot of the image motif in an observation space, wherein the image motif is composed of a sum of all dots projected by the group of structures, and wherein, when a direction of arrival of the light generated by the light source is changed and/or when the viewing angle is changed, a movement of the dot in the observation space is created.

19. A security element for papers of value or security papers, comprising:

a carrier layer of a translucent plastic material and/or a thermoplastic material, at least one color-shifting first region, and at least one second region different from the first region, with structures that reflect an image motif in different spatial regions, such that a moving image is produced for an observer when a light source is moved correspondingly and/or when a viewing angle is changed, wherein, when the light source is moved and/or the viewing angle is changed, a movement of the image motif and a color-shifting effect occur, wherein the at least one color-shifting first region has a layer with color-shifting pigments or a layer with a color-shifting thin-layer-structure, wherein the thin-layer-structure or the color-shifting pigments has at least one absorber layer, at least one reflection layer, and at least one spacer layer of a dielectric material arranged between the reflection layer and the absorber layer, wherein the structures are embossed into the carrier layer.

20. A security element for papers of value or security papers, comprising:

a carrier layer, at least one color-shifting first region, and at least one second region different from the first region, with structures that reflect an image motif in different spatial regions, such that a moving image is produced for an observer when a light source is moved correspondingly and/or when a viewing angle is changed, wherein, when the light source is moved and/or the viewing angle is changed, a movement of the image motif and a color-shifting effect occur, wherein the at least one color-shifting first region has a layer with color-shifting pigments or a layer with a color-shifting thin-layer-structure, wherein the thin-layer-structure or the color-shifting pigments has at least one absorber layer, at least one reflection layer, and at least one spacer layer of a dielectric material arranged between the reflection layer and the absorber layer, wherein the structures are formed in a lacquer layer applied to the carrier layer directly or with further intermediate layers being arranged.

21. The security element according to claim 20, wherein the lacquer layer has a thickness of between 0.5-300 μm.

* * * * *